United States Patent
Samar

(10) Patent No.: US 7,526,560 B1
(45) Date of Patent: Apr. 28, 2009

(54) METHOD AND APPARATUS FOR SHARING A SECURE CONNECTION BETWEEN A CLIENT AND MULTIPLE SERVER NODES

(75) Inventor: Vipin Samar, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/539,266

(22) Filed: Mar. 30, 2000

(51) Int. Cl.
*G06F 15/16* (2006.01)

(52) U.S. Cl. .................... 709/228; 709/227; 709/229; 714/18

(58) Field of Classification Search ................ 709/200, 709/201, 224, 228–232; 713/165–168; 714/4
See application file for complete search history.

(56) References Cited

U.S. PATENT DOCUMENTS

| | | | |
|---|---|---|---|
| 5,838,812 A * | 11/1998 | Pare et al. ................... 382/115 |
| 5,923,832 A | 7/1999 | Shirakihara et al. .... 395/182.13 |
| 6,026,163 A * | 2/2000 | Micali .......................... 705/80 |
| 6,041,357 A * | 3/2000 | Kunzelman et al. ......... 709/228 |
| 6,085,220 A * | 7/2000 | Courts et al. ................ 709/201 |
| 6,105,133 A * | 8/2000 | Fielder et al. ............... 713/169 |
| 6,134,582 A * | 10/2000 | Kennedy ..................... 709/206 |
| 6,170,017 B1 * | 1/2001 | Dias et al. ................... 709/235 |
| 6,198,824 B1 * | 3/2001 | Shambroom ................ 380/279 |
| 6,282,522 B1 * | 8/2001 | Davis et al. .................. 705/41 |
| 6,317,786 B1 * | 11/2001 | Yamane et al. ............. 709/224 |
| 6,363,363 B1 * | 3/2002 | Haller et al. ................. 705/40 |
| 6,367,009 B1 * | 4/2002 | Davis et al. ................ 713/166 |
| 6,421,768 B1 * | 7/2002 | Purpura ...................... 711/164 |
| 6,424,992 B2 * | 7/2002 | Devarakonda et al. ...... 709/203 |
| 6,539,494 B1 * | 3/2003 | Abramson et al. ............ 714/4 |
| 6,571,335 B1 * | 5/2003 | O'Donnell et al. .......... 713/173 |
| 6,748,420 B1 * | 6/2004 | Quatrano et al. ............ 709/205 |
| 6,772,333 B1 * | 8/2004 | Brendel ...................... 713/153 |
| 6,877,095 B1 * | 4/2005 | Allen ......................... 713/182 |
| 6,985,953 B1 * | 1/2006 | Sandhu et al. .............. 709/229 |
| 7,120,802 B2 * | 10/2006 | Shear et al. ................. 713/194 |

OTHER PUBLICATIONS

R. Rivest, The MD5 Message-Digest Algorithm, Apr. 1992, RFC 1321, pp. 1-21.*

* cited by examiner

*Primary Examiner*—David E England
(74) *Attorney, Agent, or Firm*—Park, Vaughan & Fleming LLP

(57) ABSTRACT

One embodiment of the present invention provides a system for sharing a secure communication session with a client between a plurality of servers. The system operates by receiving a message from the client at a first server. This message includes a session identifier, which identifies a secure communication session with the client. If the session identifier does not correspond to an active secure communication session on the first server, the first server establishes an active secure communication session with the client by attempting to retrieve security state information from a second server, which had an active secure communication session with the client. If the first server is able to retrieve this security state information, the first server uses this state information to establish the active secure communication session with the client without having to communicate with the client. If the first server is not able to retrieve this state information, the first server communicates with the client to establish the secure communication session with the client.

6 Claims, 4 Drawing Sheets

METHOD AND APPARATUS FOR SHARING A SECURE CONNECTION BETWEEN A CLIENT AND MULTIPLE SERVER NODES

BACKGROUND

1. Field of the Invention

The present invention relates to connections between computer systems established across computer networks. More specifically, the present invention relates to a method and an apparatus for sharing a single secure connection with a client computer system between multiple servers, so that each of the multiple servers does not have to separately establish a secure connection with the client computing system.

2. Related Art

The advent of computer networks has led to an explosion in the development of applications that facilitate rapid communication of information between computer systems.

One problem with sending information across computer networks is that it is hard to ensure that sensitive information is kept confidential. This is because a message containing sensitive information can potentially traverse many different computer networks, and many different computer systems, before it arrives at its ultimate destination. An adversary can potentially intercept a message at any of these intermediate points along the way.

One way to remedy this problem is to "encrypt" sensitive data using an encryption key so that only someone who possesses a corresponding decryption key can decrypt the data. (Note that for commonly used symmetric encryption mechanisms the encryption key and the decryption key are the same key.) For example, a person sending sensitive data across a computer network can encrypt the sensitive data using the encryption key before it is sent across a computer network. At the other end, a recipient of the data can use the corresponding decryption key to decrypt the data.

A number of protocols, such as the secure sockets layer (SSL) protocol, have been developed to establish secure communication channels across computer networks. The SSL protocol uses encryption and authentication techniques to ensure communications between a client and a server remain private. In establishing a SSL connection (or session) between a client and a server, the client and the server exchange a number of messages that: authenticate the server to the client (through use of a digital certificate); allow the client and the server to select cryptographic mechanisms that they both support; authenticate the client to the server (optional); use public-key encryption techniques to securely exchange shared secrets; and establish an encrypted SSL connection.

Unfortunately, there is presently no way to share the same SSL session across multiple servers within the same trusted web domain. Hence, applications must set up and maintain a separate SSL connection on each server, which can greatly degrade scalability of the system.

Each secure SSL session can take anywhere between one half second to one second to establish. This is an enormously large time in comparison to the time required to establish a web connection of about 10-20 ms. Web sites currently solve this performance problem in a number of ways: by deploying large amounts of computational hardware; by limiting a service to few subscribers; or by hosting all security sensitive applications on the same machine, or by relaxing the security requirements on most of the web pages.

None of these solutions are acceptable for electronic commerce applications that require secure, scalable and modular systems in order to handle large volumes of traffic. For example, a medium-to-large electronic commerce site typically has a separate billing server, a separate account management server, a separate order server, and a separate customer management server. Furthermore, multiple instances of each of these servers may exist for load balancing and high availability purposes.

Aside from the performance problems arising from establishing secure connections, simply maintaining a public key infrastructure (PKI) revocation and authorization policy on every server can also create significant administration problems.

What is needed is a method and an apparatus that allows sharing of an established secure communication session across multiple servers.

SUMMARY

One embodiment of the present invention provides a system for sharing a secure communication session with a client between a plurality of servers. The system operates by receiving a message from the client at a first server. This message includes a session identifier, which identifies a secure communication session with the client. If the session identifier does not correspond to an active secure communication session on the first server, the first server establishes an active secure communication session with the client by attempting to retrieve security state information from a second server, which has an active secure communication session with the client. If the first server is able to retrieve this security state information, the first server uses this state information to establish the active secure communication session with the client without having to communicate with the client. If the first server is not able to retrieve this state information, the first server communicates with the client to establish the secure communication session with the client.

In one embodiment of the present invention, the system attempts to retrieve the state information by attempting to use the session identifier to identify the second server, which had an active secure communication session with the client. If such a second server is identified, the system attempts to retrieve the state information from the second server.

In one embodiment of the present invention, the system attempts to retrieve the state information from a centralized repository that is in communication with the plurality of servers. In a variation on this embodiment, the centralized repository includes a database for storing the state information.

In one embodiment of the present invention, the active secure communication session is a secure sockets layer (SSL) connection with the client.

In one embodiment of the present invention, the state information includes a session encryption key for the secure communication session, the session identifier for the secure communication session, and a running message digest for the secure communication session. In a variation on this embodiment, the system additionally uses the message to update the running message digest, and checkpoints the updated running message digest to a location outside of the first server.

In one embodiment of the present invention, if the state information for the active secure communication session is retrieved, the system purges the state information from a location from which the state information was retrieved, so that the state information cannot be subsequently retrieved by another server.

One embodiment of the present invention provides a system for sharing a secure communication session between a plurality of servers. This system operates by sending a message (including a session identifier) from a client to a first server, which has no active secure communication session with the client. Next, the system receives a response to the message from the first server. If the response indicates that no active secure communication session has been created with the client on the first server, the system communicates with the first server to establish an active secure communication session.

In one embodiment of the present invention, the system initially establishes an active secure communication session between the client and the second server, the active secure communication session being identified by the session identifier.

In one embodiment of the present invention, the client sends the message to the first server only if an active secure communication session is held by a second server, wherein the second server has an address that is related to the address of the first server.

Hence, the present invention allows for sharing of secure communication sessions (such as SSL sessions) across multiple servers, and thereby improves system scalability and performance.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), and DVDs (digital video discs).

Computer Systems

Figure 1:
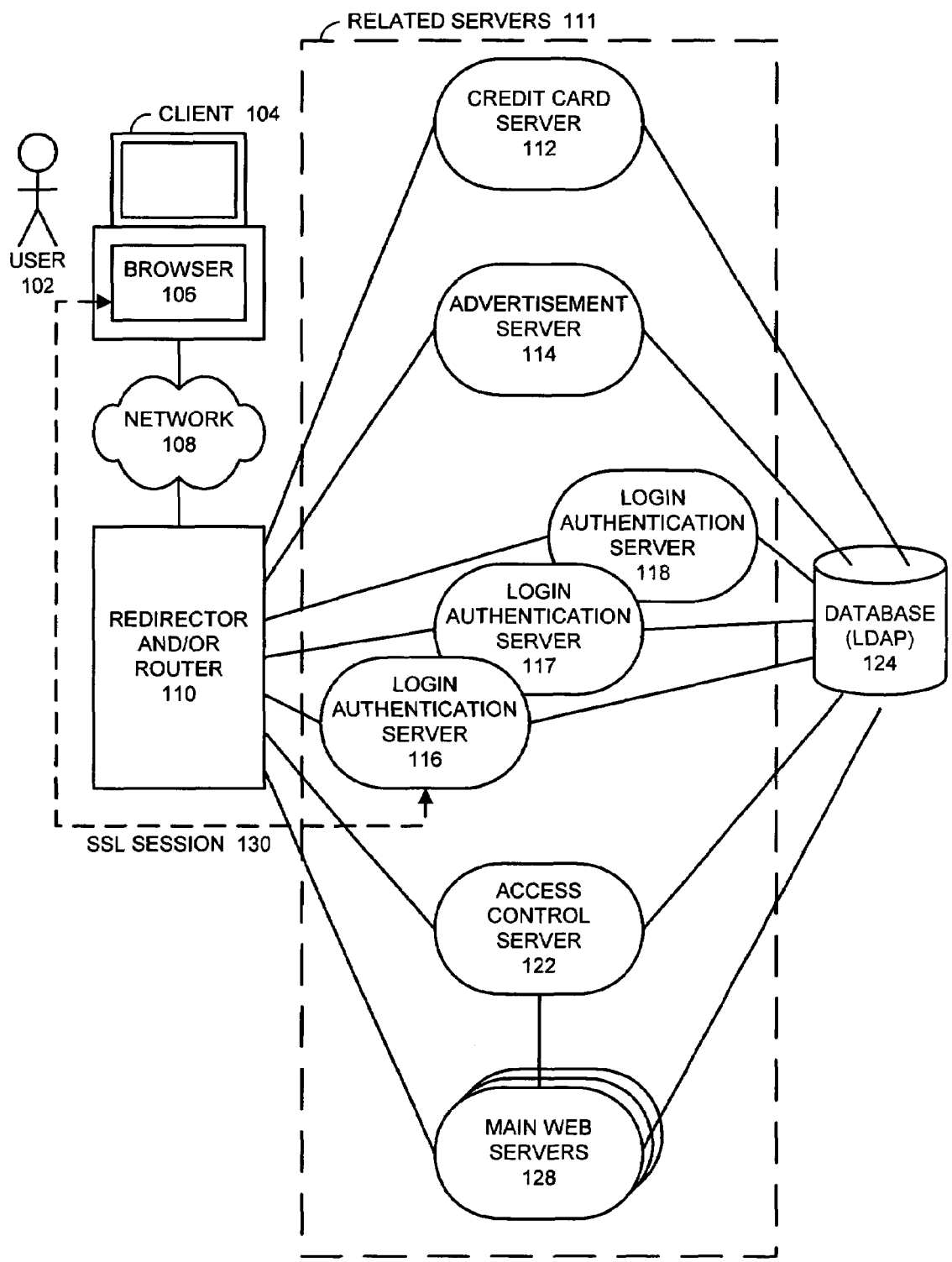
FIG. 1 illustrates a client in communication with a plurality of servers across a computer network in accordance with an embodiment of the present invention.

FIG. 1 illustrates a client 104 in communication with a plurality of related servers 111 across a computer network 108 in accordance with an embodiment of the present invention. In the embodiment illustrated in FIG. 1, user 102 accesses browser 106 on client 104 to communicate with a web site that is hosted by related servers 111.

Client 104 can include any node on a network including computational capability, and including a mechanism for communicating across network 108.

Browser 106 can include any type of web browser capable of viewing a web site, such the INTERNET EXPLORER™ browser distributed by the Microsoft Corporation of Redmond, Wash.

Network 108 can include any type of wire or wireless communication channel capable of coupling together computing nodes. This includes, but is not limited to, a local area network, a wide area network, or a combination of networks. In one embodiment of the present invention, network 108 includes the Internet.

Client 104 communicates with related servers 111 through redirector and/or router 110. Redirector and/or router 110 can include any type of mechanism that redirects communications from client 104 between related servers 111. This redirection can take place for a number of reasons, including for load balancing and/or fault tolerance purposes. In one embodiment of the present invention, redirector and/or router 110 is part of a high availability (HA) framework for the SOLARIS™ operating system. The Solaris operating system is distributed by SUN Microsystems, Inc. of Palo Alto, Calif. In another embodiment of the present invention, redirector and/or router 110 is part of a load balancing system for related servers 111. In yet another embodiment, redirector and/or router 110 is part of one or more network routers.

In one embodiment of the present invention, related servers 111 communicate with database 124 in order to store information relating to established communication sessions (such as SSL connections) on related servers 111. This allows related servers 111 to share information on communication sessions, which enables related servers 111 to share communication sessions. In one embodiment of the present invention communications with database 124 adhere to the lightweight directory access protocol (LDAP), or alternatively a native protocol, such as the NET8™ protocol developed by the Oracle Corporation of Redwood Shores, Calif.

Related servers 111 can include any nodes on a computer network including a mechanism for servicing requests from a client for computational and/or data storage resources. In the embodiment illustrated in FIG. 1, related servers 111 cooperate with each other in order to provide electronic commerce services for client 104. To this end related servers 111 include: credit card server 112, which handles payments using credit card numbers; advertisement server 114, which handles computational activity related to providing advertising space on an electronic commerce web site; access control server 122, which handles security for related servers 111; login authentication servers 116-118, which handle the process of authenticating entities that communicate with related servers 111; and main web servers 128, which perform most of the web hosting functions and handle most of the web-related traffic from client computer systems. Note that all of the above-listed servers can be replicated for load balancing and/or fault-tolerance purposes. Also note that different parts of web pages can be stored on different servers.

During operation, the system illustrated in FIG. 1 operates generally as follows. Client 104 establishes a communication session (such as SSL session 130) with a login authentication server (such as login authentication server 116). Establishing this communication session involves a number of communications between client 104 and login authentication server 116 in order to authenticate client 104, and to set up a secure communication channel between client 104 and server 116. Login authentication server 116 makes state information 200 associated with SSL session 130 available to other servers in related servers 111 either by publishing the state information 200 in database 124, or by providing state information 200 to other servers when it is requested. This allows other servers within related servers 111 to use existing SSL session 130 without having to go through the time-consuming process of setting up a new communication session and all of the related public key cryptography.

Note that although the present invention is presented in the context of a SSL session 130 and a group of related servers 111 that provide a web site to client 104, the present invention is not limited to this context. In general, the present invention can be applied to any system in which a group of related computers are able to share information relating to an established communication session with another computer where the initial setup is extremely expensive.

Communication Session State Information

Figure 2:
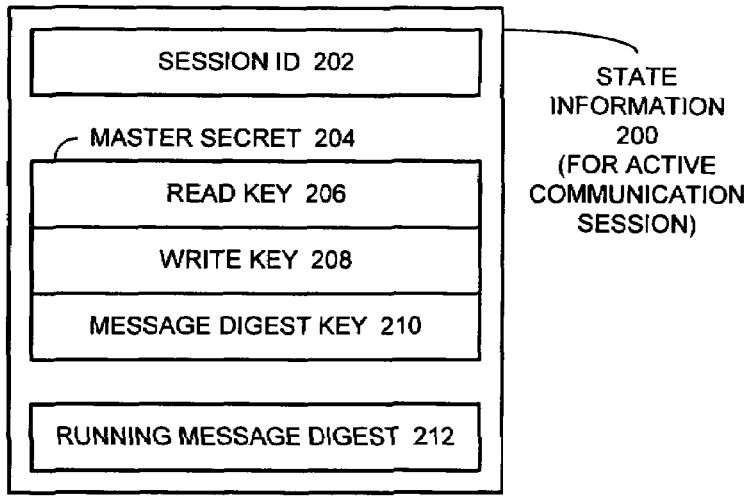
FIG. 2 illustrates the structure of state information for a secure communication session in accordance with an embodiment of the present invention.

FIG. 2 illustrates the structure of state information 200 for a communication session in accordance with an embodiment of the present invention. Note that FIG. 2 illustrates some of the state information that is kept as part of an SSL session, such as SSL session 130 illustrated in FIG. 1. During initialization of the communication session, client 104 and server 116 agree on a session ID 202, which uniquely identifies the communication session. Note that the SSL protocol allows for resuming of the existing SSL session between client 104 and server 116 by including support for client 104 to send session ID 202 to server 116. One embodiment of the present invention uses this feature to send the session ID 202 to other "trusted" servers. (The notion of trust is implementation-specific but can include servers in the same domain, for example.)

As part of the SSL protocol, client 104 and server 116 also agree on a master secret 204, which contains various items including a read key 206 for encrypting communications from client 104 to server 116, and a write key 208 for encrypting communications in the other direction, from server 116 to client 104. It also contains a message digest key 210, which is used to encrypt the running message digest 212.

Running message digest 212 is also part of state information 200. Running message digest 212 contains a cumulative message digest for communications across SSL session 130. Note that running message digest 212 continually changes as messages are sent through SSL session 130. Hence, the current version of running message digest 212 must be available to any server that wants to share the communication session.

Operation of Client

Figure 3:
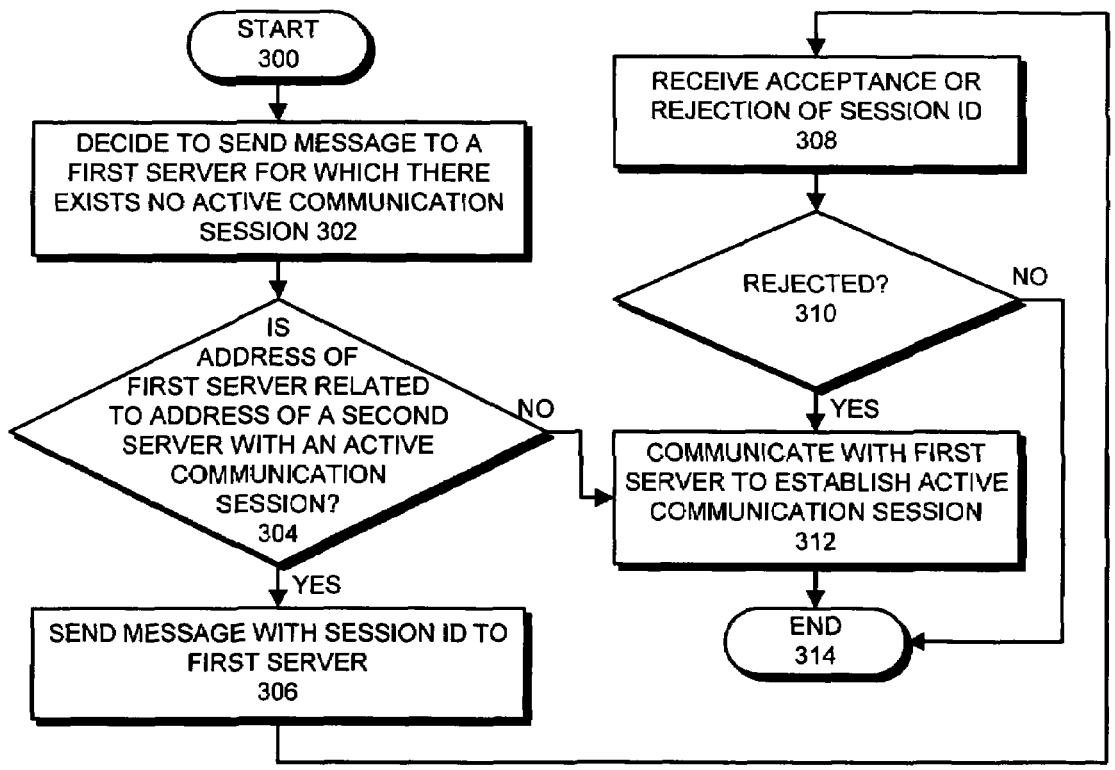
FIG. 3 is a flow chart illustrating how a client communicates with a server in accordance with an embodiment of the present invention.

FIG. 3 is a flow chart illustrating how a client 104 communicates with a server 118 in accordance with an embodiment of the present invention. Client 104 first decides to send a message to a server with which client 104 has no active communication session (such as server 118) (step 302). Next, client 104 determines if the address of server 118 is related to the address of another server with which client 104 has an active communication session (step 304). For example, in FIG. 1 client 104 may determine that the address of server 118 indicates that it is related to server 116, which has an active communication session 130 with client 104. Note that the addresses of servers 116 and 118 may be related in a number of ways, they may share the same domain name service (DNS) host name, they may have similar Internet Protocol (IP) addresses or they may have the same IP address, but different port numbers.

If client 104 determines the address of server 118 is not related to the address of a server that has an active communication session with client 104, client 104 starts a fresh connection with server 118 in order to establish an active communication session with server 118 (step 312).

If client 104 determines that the address is related to the address of a server that has an active communication session with client 104, client 104 sends a message including session ID 202 to server 118 (step 306). Next, client 104 receives an acceptance or a rejection of session ID 202 from server 118 (step 308). If client 104 receives a rejection, client 104 communicates with server 118 in order to establish a new communication session with server 118 (step 312). If client 104 receives an acceptance, then server 118 was able to establish a communication session with client 104 using information from a related server.

Initializing and Maintaining a Communication Session

Figure 4:
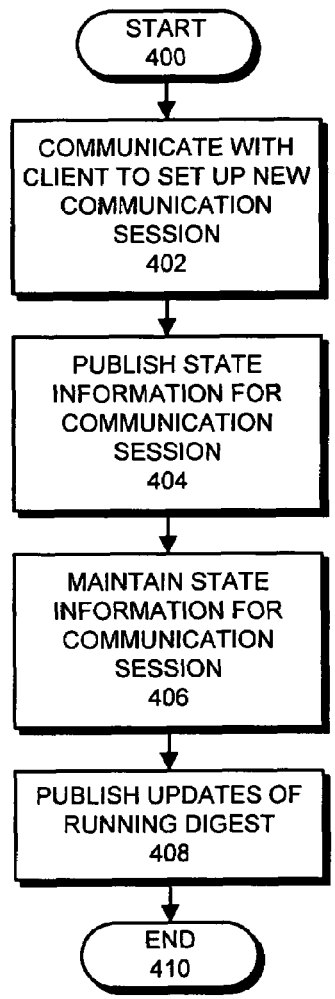
FIG. 4 is a flow chart illustrating how a server sets up and maintains a new secure communication session in accordance with an embodiment of the present invention.

FIG. 4 is a flow chart illustrating how a server 116 sets up and maintains a new communication session client with a client 104 in accordance with an embodiment of the present invention. First, server 116 communicates with client 104 to set up the new communication session (for example SSL session 130 from FIG. 1) (step 402). Next, in one embodiment of the present invention, server 116 publishes state information 200 for SSL session 130 to a location outside of server 116 so that it is available to related servers that may want to share SSL session 130 (step 404). For example, server 116 may publish state information 200 for SSL session 130 to database 124. In an alternative embodiment, server 116 does not publish state information 200, but rather waits until state information 200 is requested by another server, and then sends state information 200 to the other server.

During operation, server 116 maintains state information 200 (step 406). This maintenance process includes updating running message digest 212 as messages pass through SSL session 130. In one embodiment of the present invention, server 116 publishes updates to running message digest 212 to database 124 so that other servers can share the updates (step 408).

Configuring Server to Use Existing Communication Session

Figure 5:
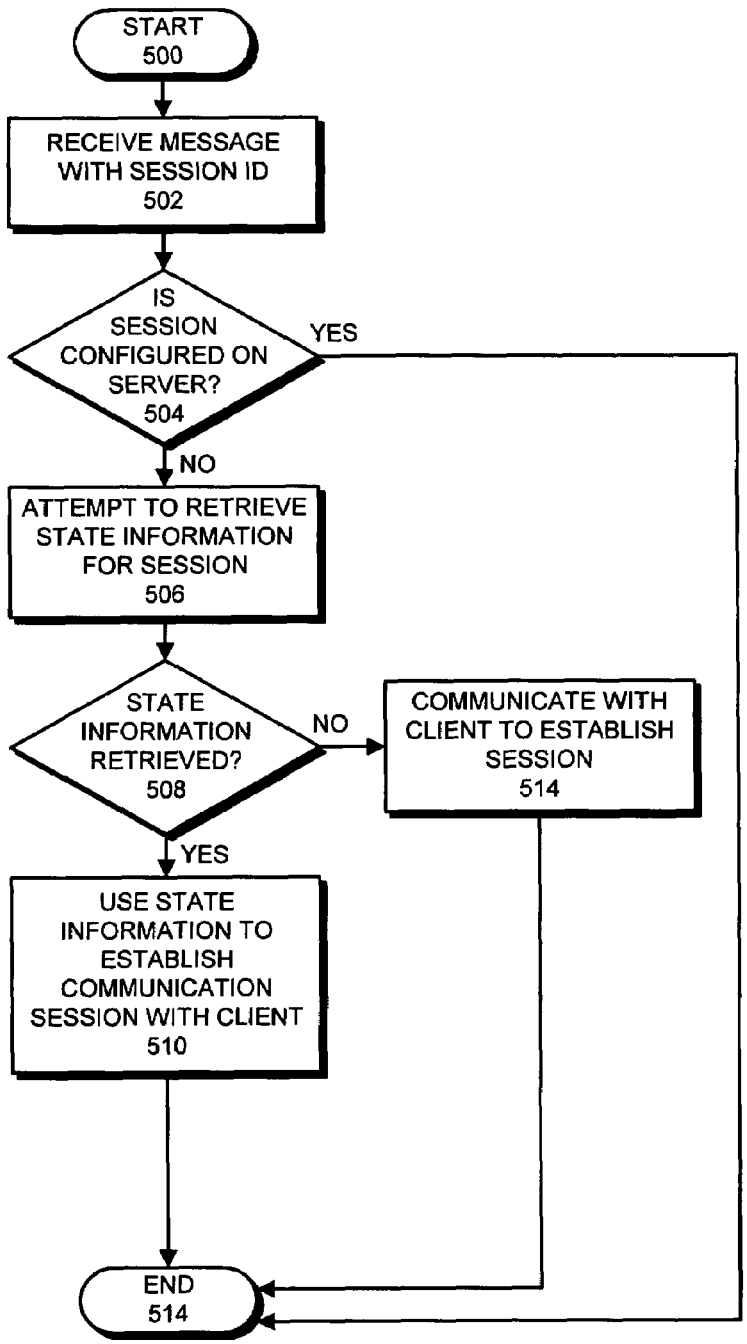
FIG. 5 is a flow chart illustrating how a server configures itself to use an existing secure communication session on another server in accordance with an embodiment of the present invention.

FIG. 5 is a flow chart illustrating how a server 118 configures itself to use an existing communication session from another server in accordance with an embodiment of the present invention. Server 118 first receives a message from client 104 that contains session ID 202 (step 502). Server 118 next performs a lookup on session ID 202 to determine if the associated communication session (for example SSL session 130 from FIG. 1) is configured on server 118 (step 504). If so, the configuration process is complete aside from perhaps notifying client 104 that session ID 202 is valid.

If the associated communication session is not configured on server 118, the system attempts to retrieve state information 200 for the communication session (step 506). In one embodiment of the present invention, server 118 queries database 124 in order to retrieve state information 200. In another embodiment, server 118 queries another related server, such as server 116, to obtain state information 200. Server 118 can determine which server to query in a number of different ways, including through examining session ID 202 for an embedded server identifier, or by performing a lookup in database 124.

If server 118 is not able to retrieve state information 200, it must communicate with client 104 to establish a new communication session (step 514).

If server 118 is able to retrieve state information 200, it uses state information 200 to establish a communication session with client 104 (step 510).

Forwarding State Information

Figure 6:
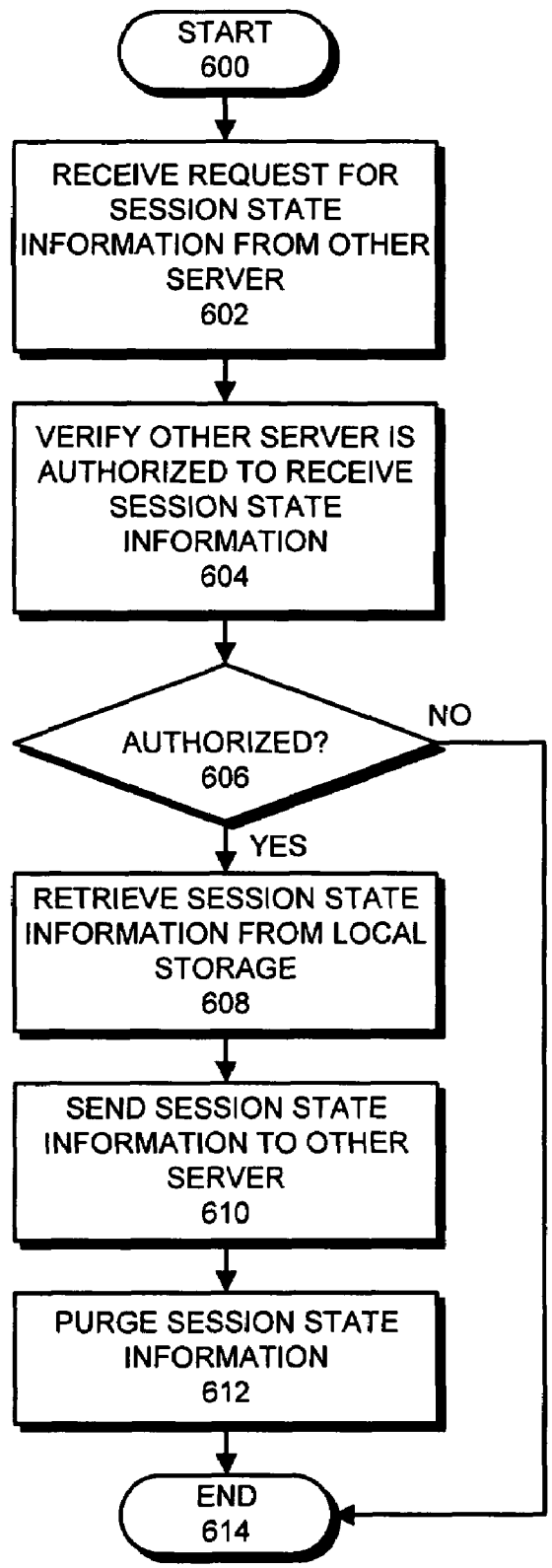
FIG. 6 is a flow chart illustrating how a server or other repository forwards communication session state information to a requesting server in accordance with an embodiment of the present invention.

FIG. 6 is a flow chart illustrating how a server or other repository forwards communication session state information 200 to a requesting server in accordance with an embodiment of the present invention. In one embodiment of the present invention, the forwarding process illustrated in FIG. 6 applies to a database 124 that maintains communication session state information for active communication sessions held by related servers 111. In another embodiment, the forwarding process applies to a server 116 that forwards communication session state information to a requesting server 118.

The system starts by receiving a request for state information 200 from a requesting server 118 (step 602). The system then verifies that the requesting server 118 is authorized to receive session state information 200 (step 604). This authorization can be performed through a number of mechanisms, including through a digital certificate, or by verifying that the other server 118 belongs to the same trusted domain.

If the other server 118 is not authorized, the system does not send state information 200 to requesting server 118.

If the other server 118 is authorized, the system retrieves session state information 200 from local storage (step 608), and sends session state information 200 to the other server 118 (step 610).

The system then purges state information 200 from its local storage so that another server does not request and receive the same state information 200 (step 612).

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art.

Note that although the present invention is often described in terms of secure communication protocols, such as SSL, the present invention is not meant to be limited to secure communication protocols, such as SSL. The present invention also applies to other secure communication protocols such as the transport layer security (TLS) protocol, and generally applies to all communication sessions (secure or non-secure) that require state information to be maintained at a server.

Additionally, the above disclosure is not intended to limit the present invention. The scope of the present invention is defined by the appended claims.

What is claimed is:

1. A method for sharing a secure communication session, the method comprising,
    establishing a secure socket layer (SSL) session between a client and a first server, wherein the first server publishes on a database a set of session state information for the SSL session, and wherein the SSL session state information includes:
    an SSL session identifier;
    a read key for encrypting communications from the client;
    a write key for encrypting communications from the first server;
    an encrypted running message digest; and
    a message digest key which is used to encrypt the running message digest; and
    wherein the first server continually changes the running message digest as messages are sent through the SSL session, and wherein the first server publishes updates to the running message digest to the database;
    receiving a message from the client at a second server, wherein the message includes the SSL session identifier which identifies the SSL session between the client and the first server, and wherein the second server contains different content and performs different functions from the first server;
    determining that an SSL session corresponding to the received session identifier is not configured on the second server;
    querying the database with the received SSL session identifier;
    retrieving from the database the SSL session state information which corresponds to the received SSL session identifier and which is published by the first server,
    establishing an SSL session between the client and the second server with the same SSL session identifier based on the retrieved SSL session state information; and
    using the running message digest to send a second message from the second server to the client through the SSL session without establishing a separate SSL session between the client and the second server.

2. The method of claim 1, wherein retrieving the running message digest includes authenticating and authorizing the first server.

3. A computer-readable storage medium storing instructions that when executed by a computer cause the computer to perform a method for sharing a secure communication session, the method comprising:
    establishing an SSL session between a client and a first server, wherein the first server publishes on a database a set of session state information for the SSL session, and wherein the SSL session state information includes:
    an SSL session identifier;
    a read key for encrypting communications from the client;
    a write key for encrypting communications from the first server;
    an encrypted running message digest; and
    a message digest key which is used to encrypt the running message digest; and
    wherein the first server continually changes the running message digest as messages are sent through the SSL session, and wherein the first server publishes updates to the running message digest to the database;
    receiving a message from the client at a second server, wherein the message includes the SSL session identifier which identifies the SSL session between the client and the first server, and wherein the second server contains different content and performs different functions from the first server;
    determining that an SSL session corresponding to the received session identifier is not configured on the second server;
    querying the database with the received SSL session identifier;
    retrieving from the database the SSL session state information which corresponds to the received SSL session identifier and which is published by the first server; and
    establishing an SSL session between the client and the second server with the same SSL session identifier based on the retrieved SSL session state information; and
    using the running message digest to send a second message from the second server to the client through the SSL session without establishing a separate SSL session between the client and the second server.

4. The computer-readable storage medium of claim 3, wherein retrieving the running message digest includes authenticating and authorizing the first server.

5. An apparatus that shares a secure communication session, comprising:
   an establishing mechanism configured to establish an SSL session between a client and a first server, wherein the first server publishes on a database a set of session state information for the SSL session, and wherein the SSL session state information includes:
   an SSL session identifier;
   a read key for encrypting communications from the client;
   a write key for encrypting communications from the first server;
   an encrypted running message digest; and
   a message digest key which is used to encrypt the running message digest; and
   wherein the first server continually changes the running message digest as messages are sent through the SSL session, and wherein the first server publishes updates to the running message digest to the database;
   a receiving mechanism configured to receive a message from the client at a second server which identifies the SSL session between the client and the first server, wherein the first message includes the SSL session identifier, and wherein the second server contains different content and performs different functions from the first server;
   a determination mechanism configured to determine that an SSL session corresponding to the received session identifier is not configured on the second server;
   a query mechanism configured to query the database with the received SSL session identifier;
   a retrieving mechanism configured to retrieve from the database the SSL session state information which corresponds to the received SSL session identifier and which is published by the first server;
   a second establishment mechanism configured to establish an SSL session between the client and the second server with the same SSL session identifier based on the retrieved SSL session state information; and
   a sending mechanism configured to use the running message digest to send a second message from the second server to the client through the SSL session without establishing a separate SSL session between the client and the second server.

6. The apparatus of claim 5, wherein the retrieving mechanism is configured to authenticate and authorize the first server prior to retrieving the running message digest.

* * * * *

UNITED STATES PATENT AND TRADEMARK OFFICE
CERTIFICATE OF CORRECTION

PATENT NO. : 7,526,560 B1 Page 1 of 1
APPLICATION NO. : 09/539266
DATED : April 28, 2009
INVENTOR(S) : Samar It is certified that error appears in the above-identified patent and that said Letters Patent is hereby corrected as shown below:

In column 7, line 55, in claim 1, delete "comprising," and insert -- comprising: --, therefor.

In column 8, line 18, in claim 1, delete "server," and insert -- server; --, therefor.

Signed and Sealed this

Eighth Day of June, 2010

David J. Kappos
*Director of the United States Patent and Trademark Office*